United States Patent [19]
Furukawa

[11] Patent Number: 5,933,313
[45] Date of Patent: Aug. 3, 1999

[54] PULSE-WIDTH MODULATION CONTROL SYSTEM FOR ELECTRONIC DEVICE

[75] Inventor: Hideo Furukawa, Wako, Japan

[73] Assignee: Honda Giken Kogyo Kabushiki Kaisha, Tokyo, Japan

[21] Appl. No.: 08/610,068

[22] Filed: Feb. 29, 1996

[30] Foreign Application Priority Data

Mar. 2, 1995 [JP] Japan .................................. 7-068761

[51] Int. Cl.$^6$ .................................................. H01H 47/02
[52] U.S. Cl. ........................................... 361/154; 361/152
[58] Field of Search .................................. 361/152, 154, 361/160; 123/490

[56] References Cited

U.S. PATENT DOCUMENTS

| | | | |
|---|---|---|---|
| 4,745,514 | 5/1988 | Takeshima et al. | 361/154 |
| 4,953,056 | 8/1990 | Yakuwa et al. | 361/154 |

FOREIGN PATENT DOCUMENTS

| | | |
|---|---|---|
| 2-300556 | 12/1990 | Japan . |
| 3-153980 | 7/1991 | Japan . |
| 3-199757 | 8/1991 | Japan . |
| 4-50550 | 2/1992 | Japan . |

*Primary Examiner*—Fritz Fleming
*Attorney, Agent, or Firm*—Armstrong, Westerman, Hattori, McLeland, & Naughton

[57] ABSTRACT

A control system for an electronic device such as a solenoid for a vehicle transmission which is controlled by PWM. In the system, a difference ($I_H-I_L$) between the maximum value and the minimum value of current supplied to the solenoid is calculated and current supplied to the solenoid through a driver circuit is calculated based on the calculated difference and a predetermined coefficient as:

$$I = I_L + (I_H - I_L) \times K\text{duty}.$$

When a solenoid is controlled through PWM, feedback correction of the current flow becomes necessary owing to fluctuation in the voltage of the on-board power supply and fluctuation in the resistance of the electronic device with temperature. Since the instantaneous current in the solenoid varies constantly with the duty ratio, the detected value therefore differs depending on the sampling time point. Prior art smoothing solves the problem, but leads to raise the feedback high, causing overshooting. The arrangement makes it possible to detect the current without smoothing, enhancing the control performance.

9 Claims, 10 Drawing Sheets

PULSE-WIDTH MODULATION CONTROL SYSTEM FOR ELECTRONIC DEVICE

BACKGROUND OF THE INVENTION

1. Field of the Invention

This invention relates to a pulse-width modulation (PWM) control system for an electronic device, more particularly to such a control system which achieves high-response pulse-width modulation control of an electronic device such as a linear solenoid based on an accurate determination of the current flow.

2. Description of the Prior Art

As taught by Japanese Laid-Open Patent Application Nos. Hei 3(1991)-199757, Hei 3(1991)-153980, Hei 4(1992)-50550 and Hei 2(1990)-300556, for example, it is a common practice to detect the current flow through an electronic device such as a linear solenoid used in the hydraulic circuit of vehicle transmission and perform control by a pulse-width modulation or pulse-duration modulation based on the detected current flow.

When such an electronic device, particularly a vehicle linear solenoid is controlled through PWM, feed-back correction of the current flow becomes necessary owing to fluctuation in the voltage of the on-board power supply and fluctuation in the resistance of the electronic device with temperature.

Feedback control is generally conducted by detecting the current flow through the electronic device, comparing the detected value with the desired value, and using PID control law to determine a manipulated variable for eliminating the control error. As will be explained later with reference to FIG. 4, however, the instantaneous current in an electronic device varies constantly with the duty ratio. The detected value therefore differs depending on the sampling time point.

Because of this, the detection circuit is ordinarily provided with an RC circuit for smoothing the detected value, which is therefore obtained with a first-order lag. This does not cause a problem when the desired current is constant. In the case of stepped control in which the desired value is varied in steps, however, the delay of the first-order lag value relative to the actual current flow leads to the manipulated variable being determined by use of a large feedback gain for raising the control response. As explained later with reference to FIG. 6, this tends to cause overshooting of the controlled variable. Conversely, an attempt to avoid overshooting runs into the problem that it degrades control response because of the need to lower the feedback gain.

SUMMARY OF THE INVENTION

An object of this invention is therefore to overcome the aforesaid problems of the prior art by providing a pulse-width modulation control system for an electronic device which detects the current flow through the device in real time, not through a first-order lag value.

Another object of the invention is to provide a pulse-width modulation control system for an electronic device which detects the current flow through the device in real time, not through a first-order lag value, thereby enabling high-response control when the current flow is feedback controlled based on the detected value.

This invention achieves this object by providing a system for controlling an electronic device through a pulse-width modulation, comprising current detecting means for detecting an actual current supplied to the electronic device at a predetermined duty ratio of the pulse-width modulation, and correcting means for correcting a command to be supplied to the electronic device based on a difference between the detected actual current and a current corresponding to the predetermined duty ratio. In the system, said current detecting means includes first point value detecting means for detecting the current supplied to the electronic device at a first point, second point value detecting means for detecting the current supplied to the electronic device at a second point, difference calculating means for calculating a difference between the first point value and the second point value, coefficient determining means for determining a coefficient based on the duty ratio, and current calculating means for calculating the current supplied to the electronic device based on the calculated difference and the determined coefficient.

BRIEF EXPLANATION OF THE DRAWINGS

This and other objects and advantages of the invention will be more apparent from the following description and drawings, in which.

DETAILED DESCRIPTION OF THE PREFERRED EMBODIMENTS

An embodiment of the invention will now be explained with reference to the attached drawings.

Figure 1:
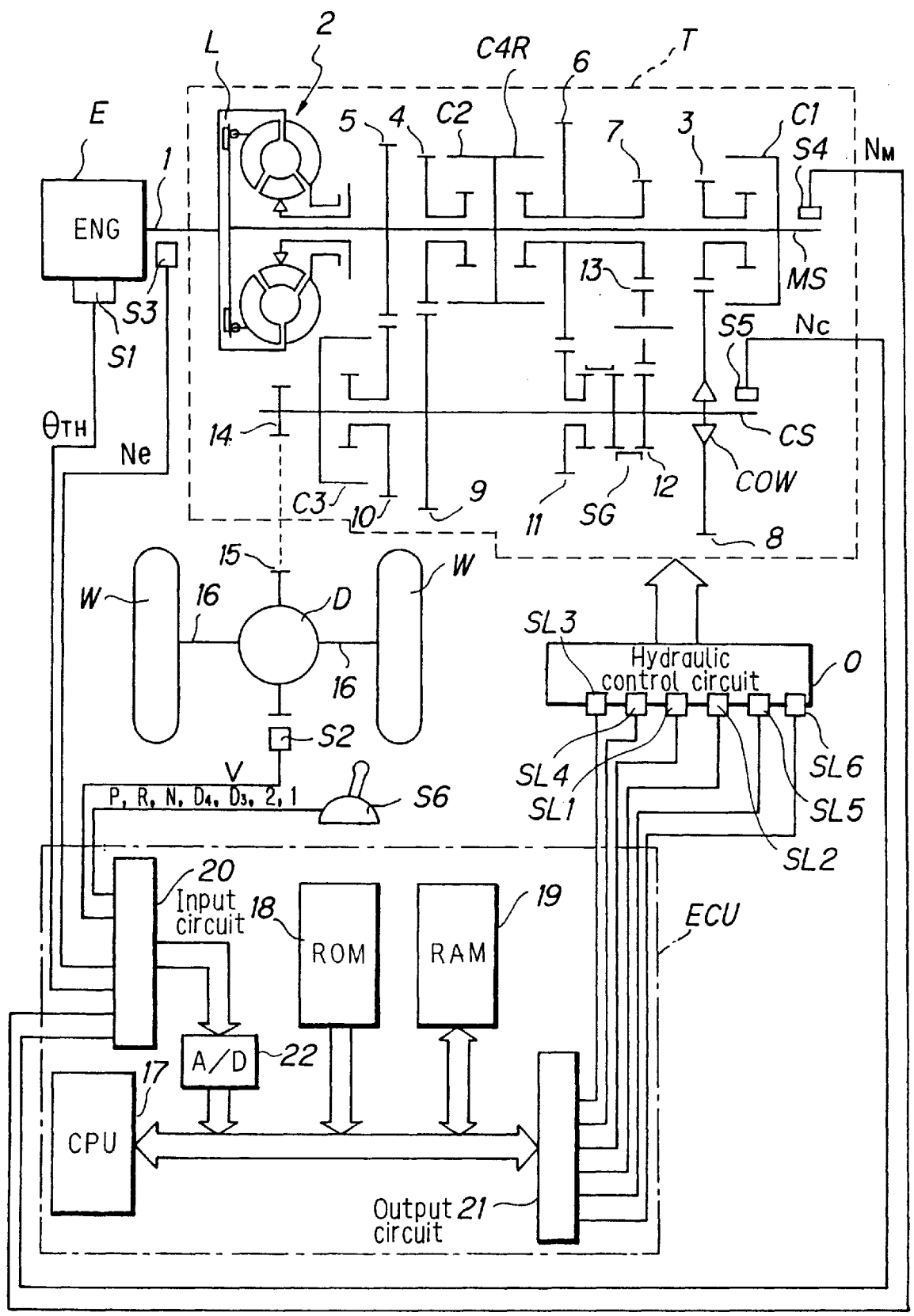
FIG. 1 is an overall view of the pulse-width modulation control system for an electronic device applied in a hydraulically operated vehicle transmission control system.

FIG. 1 is an overall view of the pulse-width control system for an electronic device according to the invention taking as an example an application in a control system for a hydraulically operated vehicle transmission.

As shown in FIG. 1, a vehicle automatic transmission T is equipped with a main shaft MS connected with the crankshaft 1 of an internal combustion engine E through a torque converter 2 having a lockup clutch L and with a countershaft CS connected with the main shaft MS through multiple gear trains.

The main shaft MS supports a main first-speed gear 3, a main second-speed gear 4, a main third-speed gear 5, a main fourth-speed gear 6 and a main reverse gear 7. The countershaft CS supports a counter first-speed gear 8 engaged with the main first-speed gear 3, a counter second-speed gear 9 engaged with the main second-speed gear 4, a counter third-speed gear 10 engaged with the main third-speed gear 5, a counter fourth-speed gear 11 engaged with the main fourth-speed gear 6 and a counter reverse gear 12 engaged with the main reverse gear 7 through a reverse idle gear 13.

The first gear is established when the main first-speed gear 3 rotatably supported on the main shaft MS is connected with the main shaft MS by a first-speed hydraulic clutch C1. Since the first-speed hydraulic clutch C1 is also maintained in the engaged state during establishment of the second to fourth gears, the counter first-speed gear 8 is supported by a one-way clutch COW.

The second gear is established when the main second-speed gear 4 rotatably supported on the main shaft MS is connected with the main shaft MS by a second-speed hydraulic clutch C2. The third gear is established when the counter third-speed gear 10 rotatably supported on counter-shaft CS is connected with the countershaft CS by a third-speed hydraulic clutch C3.

The fourth gear is established when the counter fourth-speed gear 11 rotatably supported on the countershaft CS is connected with the countershaft CS by a selector gear SG and with this state maintained the main fourth-speed gear 6 rotatably supported on the main shaft MS is connected with the main shaft MS by a fourth-speed reverse hydraulic clutch C4R.

The reverse gear is established when the counter reverse gear 12 rotatably supported on the counter-shaft CS is connected with the countershaft CS by the selector gear SG and with this state maintained the main reverse gear 7 rotatably supported on the main shaft MS is connected with the main shaft MS by the fourth-speed reverse hydraulic clutch C4R.

The rotation of the countershaft CS is transmitted through a final drive gear 14 and a final drive gear 15 to a differential D, from where it is transmitted to drive wheels W, W through left and right drive shafts 16, 16.

A throttle position sensor S1 is provided in the air intake pipe (not shown) of the engine E at a point in the vicinity of a throttle valve (not shown) for detecting the degree of opening θTH of the throttle valve. A vehicle speed sensor S2 for detecting the vehicle speed V from the rotational speed of the final driven gear 15 is provided in the vicinity of the final driven gear 15. A crank angle sensor S3 is provided in the vicinity of the crankshaft 1 for detecting the engine speed Ne from the rotation of the crankshaft 1.

An input shaft rotational speed sensor S4 is provided in the vicinity of the main shaft MS for detecting the rotational speed NM of the transmission input shaft from the rotation of the main shaft MS, and an output shaft rotational speed sensor S5 is provided in the vicinity of the countershaft CS for detecting the rotational speed NC of the transmission output shaft from the rotation of the countershaft CS. A shift lever position sensor S6 is provided in the vicinity of a shift lever (not shown) installed on the vehicle floor near the driver's seat. The shift lever position sensor S6 detects which of the seven positions P, R, N, D4, D3, 2 and 1 has been selected by the driver.

Outputs of the sensors S1, etc., are sent to an ECU (electronic control unit).

The ECU is constituted as a microcomputer comprising a CPU (central processing unit) 17, a ROM (read-only memory) 18, a RAM (random access memory) 19, an input circuit 20 and an output circuit 21. The outputs of the sensors S1, etc., are input to the microcomputer through the input circuit 20. The analog outputs are converted into digital values through an A/D converter 22 and are stored in the RAM 18, while the digital outputs of the sensors are subject to processing in a circuit such as a wave shaper (not shown) and are stored in the RAM 18.

The CPU 17 of the microcomputer determines the gear (gear ratio) to be shifted and energizes/deenergizes shift solenoids SL1, SL2 of a hydraulic control circuit O via the output circuit 21 so as to switch shift valves (not shown), thereby engaging/disengaging the hydraulic clutches of the gears concerned, while supplying current to linear solenoids SL3, SL4 to regulate the clutch hydraulic (oil) pressure. The linear solenoids operate to supply oil to the clutches in such a manner that the oil pressure is inversely proportional to the supplied current.

More specifically, the CPU 17 detects the current flow supplied to the solenoids SL3, SL4 in the manner explained below and PWM controls such that the control error between the detected value and the desired value decreases. In the figure, reference numeral SL5 denotes a solenoid for controlling the lockup clutch L of the torque converter 2 in locked-on/off states, and SL6 denotes a solenoid for controlling the lockup clutch in a slip state between the two states.

Figure 2:
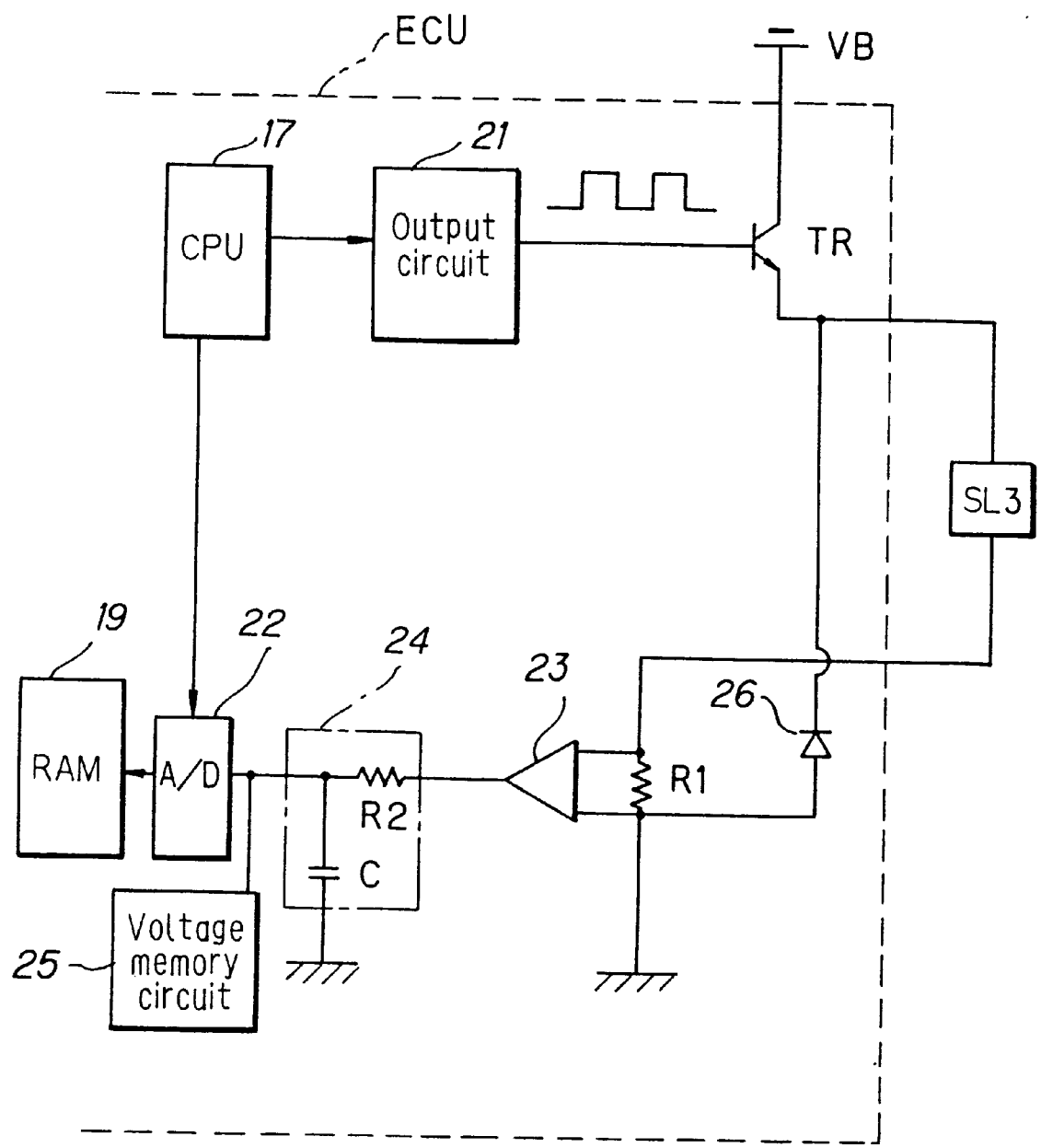
FIG. 2 is a block diagram showing the operation of the ECU illustrated in FIG. 1.

FIG. 2 is a block diagram functionally illustrating the operation of the ECU. The CPU 17 executes a routine (not shown) in accordance with instructions stored in the ROM 18 for determining command values to be sent to the linear solenoids SL3, SL4 (only SL3 is shown in the Figure) in terms of pulse train having a variable duty ratio and supplies drive (duty) pulses to a driver circuit comprising a transistor, i.e., to the base terminal of the NPN transistor TR through the output circuit 21.

The transistor TR is connected to the power source and is supplied with the power source voltage VB (12 V) of an on-board battery (not shown) and turns on in response to the supplied pulses (command) to pass current through the linear solenoid SL3. A resistor R1 is inserted in the current path on the opposite side of the linear solenoid SL3 from the transistor TR. The voltage across the resistor R1, which is proportional to the current flow, is input to an operational amplifier 23 for amplification. The output of the operational amplifier 23 is applied to the A-D converter 22 through a filter circuit 24 constituted of a resistor R2 and a capacitor C. The CPU 17 activates the A-D converter 22 at prescribed timing for fetching the input value and converting it to a digital value.

The converted value is stored in the RAM 19. The CPU 17 converts the input value to a current value in accordance with an appropriate conversion characteristic and multiplies the control error between the converted current value and the desired current value by a feedback gain calculated based on a PID control law or the like to correct the command value. Although the filter circuit 24 is an RC circuit, it is for noise removal, not for producing a first-order lag value. Reference numeral 25 designates a voltage memory circuit to be used when the number of analog sources is large and reference numeral 26 designates a flywheel diode for producing a counter electromotive force.

An explanation will now be given regarding the operation of the control system according to the embodiment.

Figure 3:
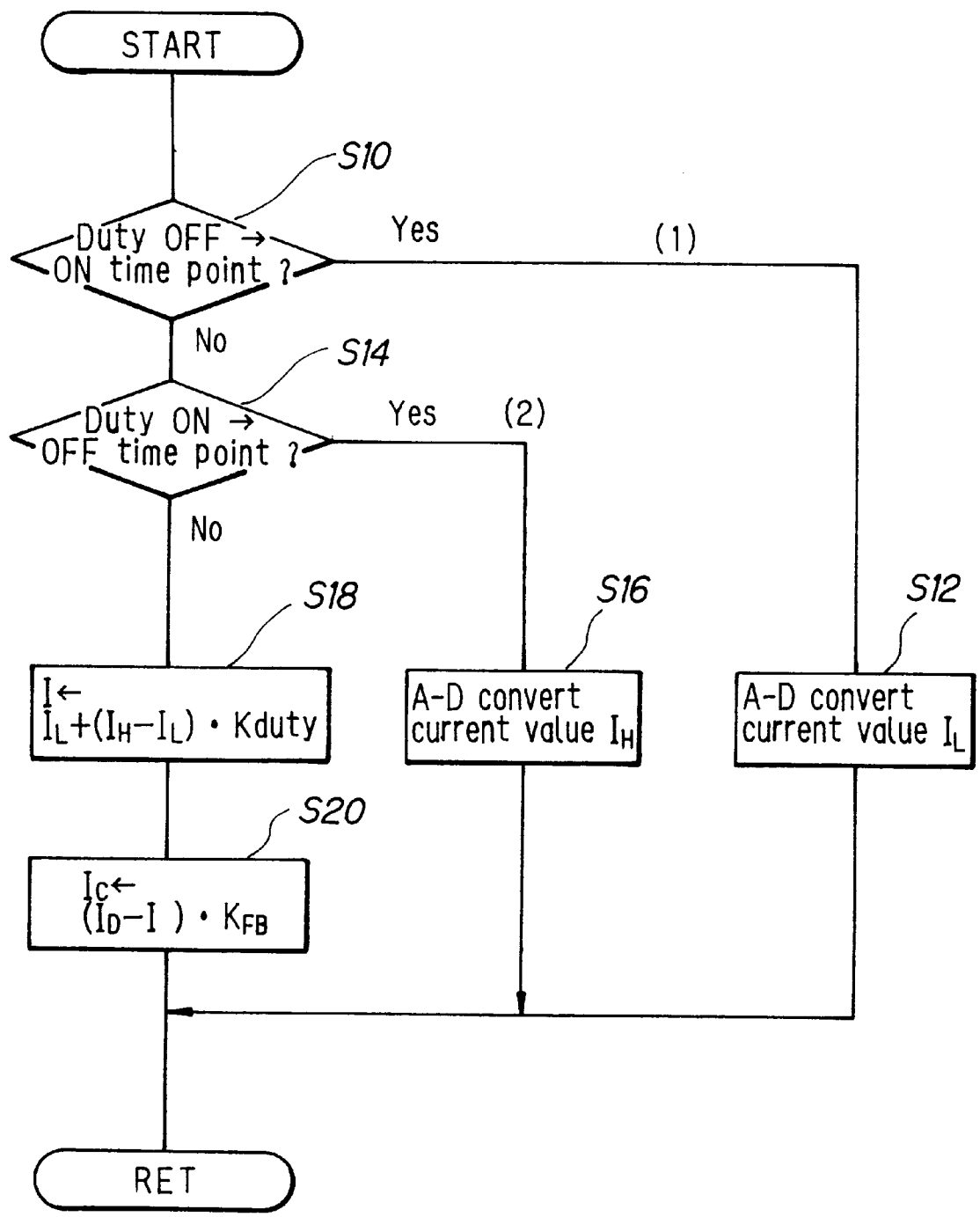
FIG. 3 is a flowchart showing the operation of the system according to the invention.
Figure 4:
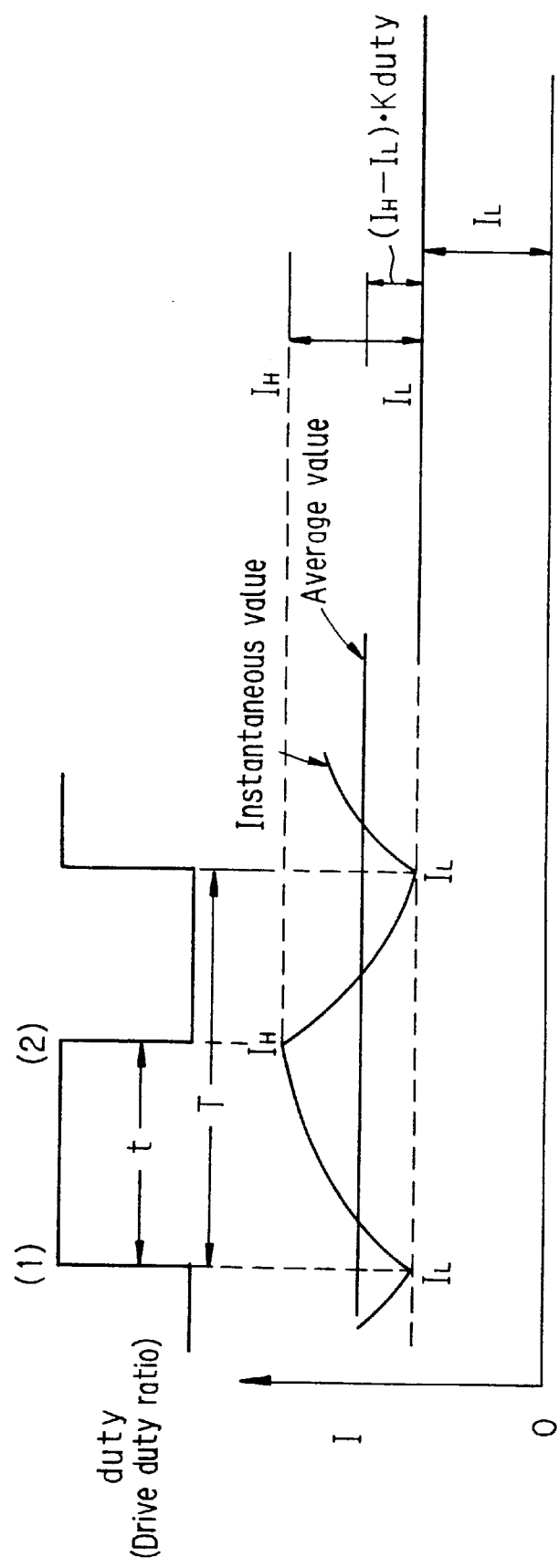
FIG. 4 is a timing chart explaining the procedures illustrated in the flowchart of FIG. 3.

FIG. 3 is a flowchart showing the operation of the control system and FIG. 4 is a timing chart for explaining the operation.

For easier understanding, the operation of the embodiment will first be explained with reference to FIG. 4.

As shown in this figure, a current I is supplied to the linear solenoid SL3 (SL4) in accordance with the determined drive duty ratio Duty (t/T) (also referred to as the "drive duty pulse"). As pointed out earlier, the instantaneous supplied current rises and falls. The actual current flow I is therefore calculated as:

$$I=I_L+(I_H-I_L)\times Kduty$$

where
- $I_L$: minimum current value at drive duty pulse leading edge (rise) point,
- $I_H$=maximum current value at drive duty pulse trailing edge (fall) point, In the above, Kduty is a coefficient determined as:

Kduty=(Average current value/cycle—Minimum current value/cycle) (Maximum current value/cycle—Minimum current value/cycle)

Figure 5:
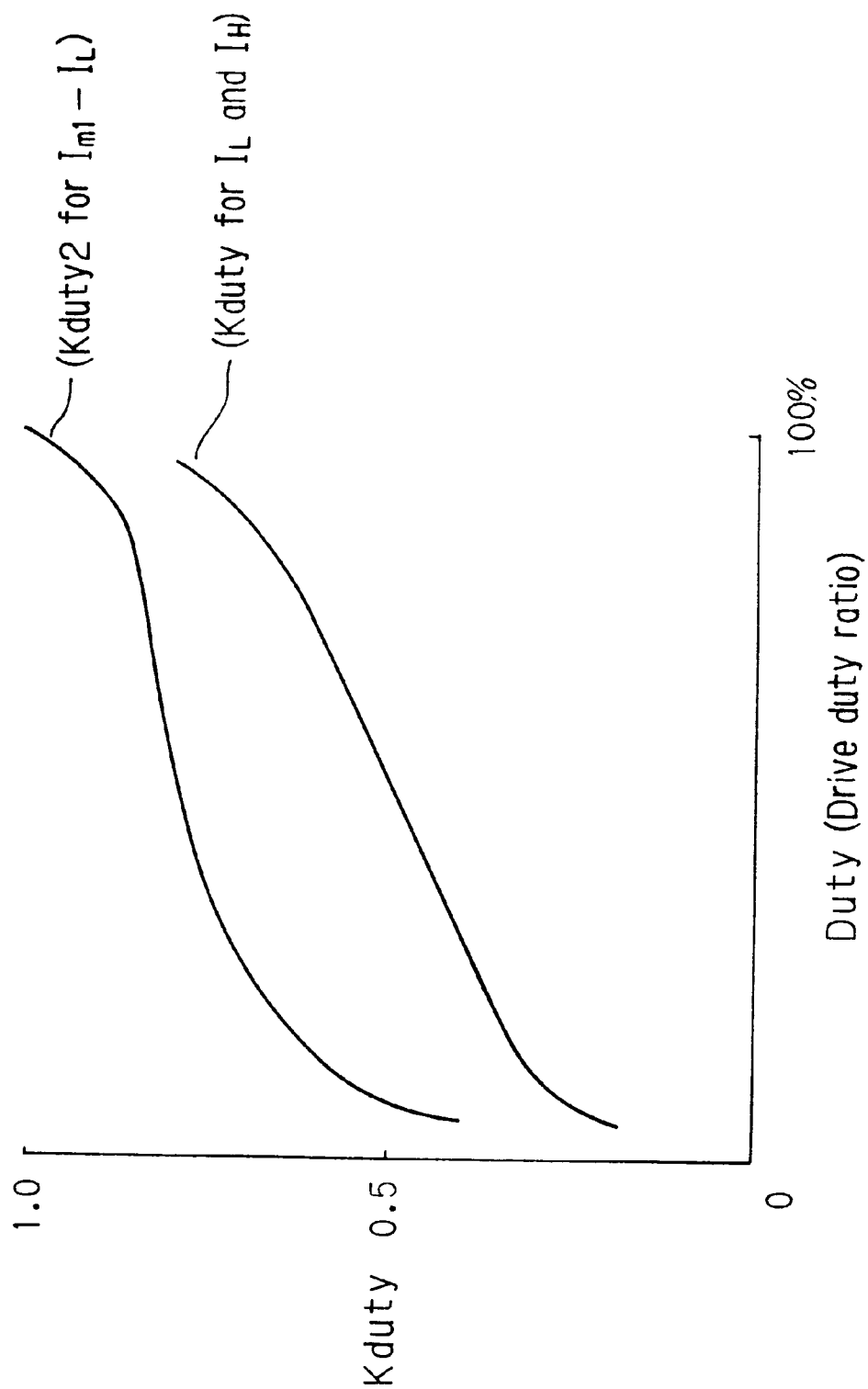
FIG. 5 is a graph showing the characteristics of a coefficient Kduty referred to in the flowchart of FIG. 3.

More specifically, Kduty is prepared as mapped data as shown in FIG. 5 to be retrievable using the drive duty ratio at the point of detection. As can be seen, it is established to extend between 0 and 1.0. Since Kduty varies as the current flow varies with the power source voltage VB and the resistance of the solenoid, it is defined the drive duty ratio.

Based on the foregoing background information, the operation of the embodiment will now b e explained with reference to the flowchart of FIG. 3. The routine of the flowchart of FIG. 3 is activated at prescribed intervals.

First, in S10, it is checked whether it is the time at which the drive duty pulse Duty is switching from OFF to ON, i.e., whether the drive duty pulse is at the rise point (leading edge) (1) shown in FIG. 4. Since the CPU 17 determines the drive duty pulse (duty ratio), it can by itself ascertain whether the drive duty pulse is at the rise point.

When S10 finds that the drive duty pulse is at the rise point, the program goes to S12, in which the current value (output of filter circuit 24) detected at that point is A-D converted and the converted value is defined as the minimum value $I_L$, whereafter the routine is once terminated.

In the next and following routine cycles (program loops), when the result in S10 is NO, the program goes to S14, in which it is checked whether it is the time at which the drive duty pulse Duty is switching from ON to OFF, i.e., whether the drive duty pulse is at the fall point (trailing edge) (2) shown in FIG. 4. When the result is YES, the program goes to S16, in which the detected current value is A-D converted and the converted value is defined as the maximum value $I_H$, whereafter the routine is once terminated.

In the next and following routine cycles, when the results in S10 and S14 are NO, the program goes to S18, in which the detected current I is calculated by the equation given earlier. Next, in S20, the obtained values are converted into current values in accordance with an appropriate table as explained before. Then, the control error between the detected value I and the command value $I_D$ is calculated and the result is multiplied by a relatively high response feedback gain $K_{FB}$ based on a PID control law to obtain the corrected command value $I_C$. The corrected command value is output to the linear solenoid SL3 or SL4 through another routine not shown in the drawings.

Since, as can be seen from the foregoing, in this embodiment the detected value is not smoothed by a first-order delay, the current flow can be detected in real time. As the difference between the actual current flow and the detected value is therefore small, feedback can be conducted based on the error between the detected value and the command value and little or no overshoot occurs even when a high-response feedback gain is used.

Figure 6:
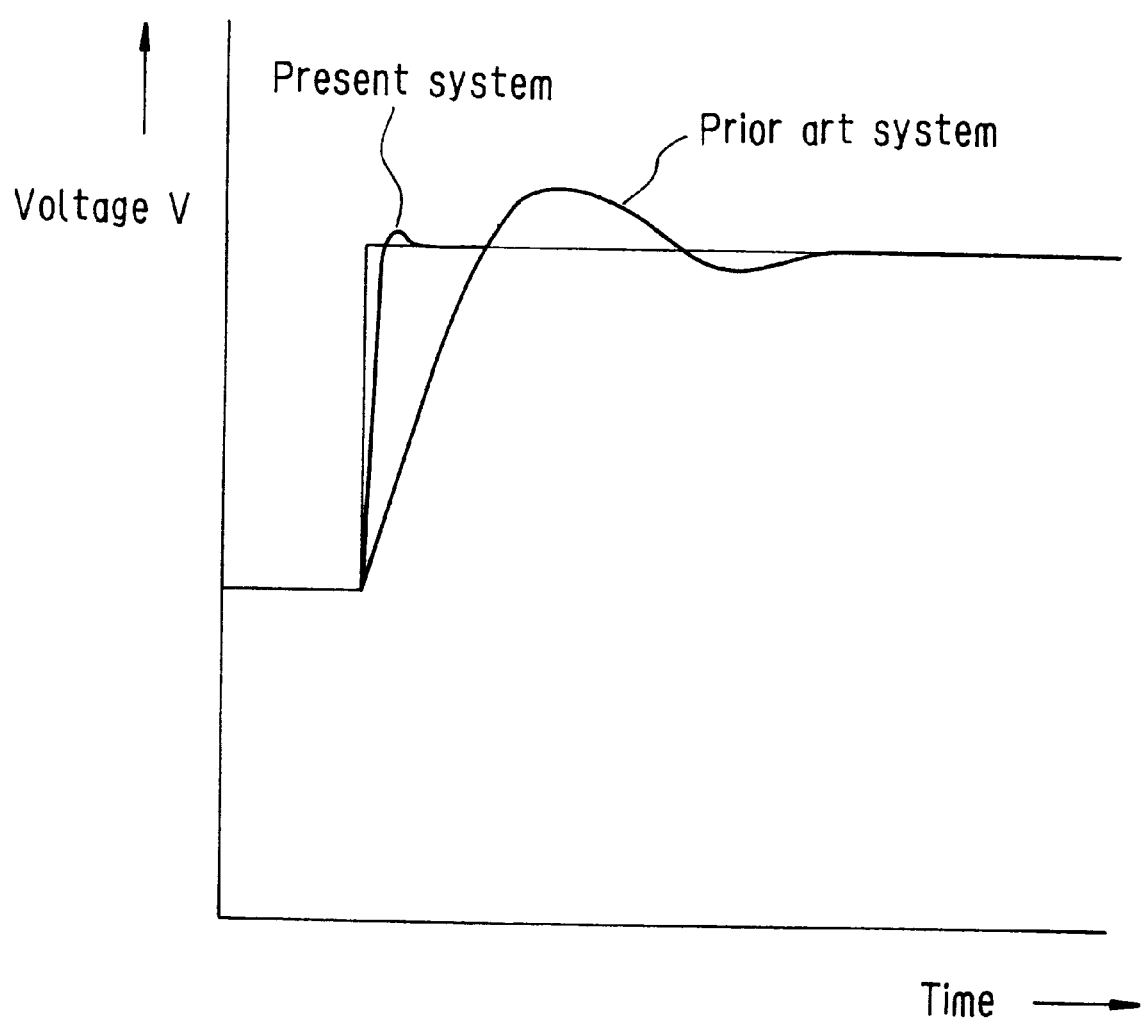
FIG. 6 is a timing chart illustrating simulation result showing the advantage of the system in contrast with the prior art.

The graph of FIG. 6 is base d on data obtained through simulation comparing the operation of the control system of the embodiment with that of the prior art. As shown, the amount of overshoot in the case of the present control system is much smaller than that in the case of the prior art. The system therefore enables an improvement in the response of the feedback control.

Figure 7:
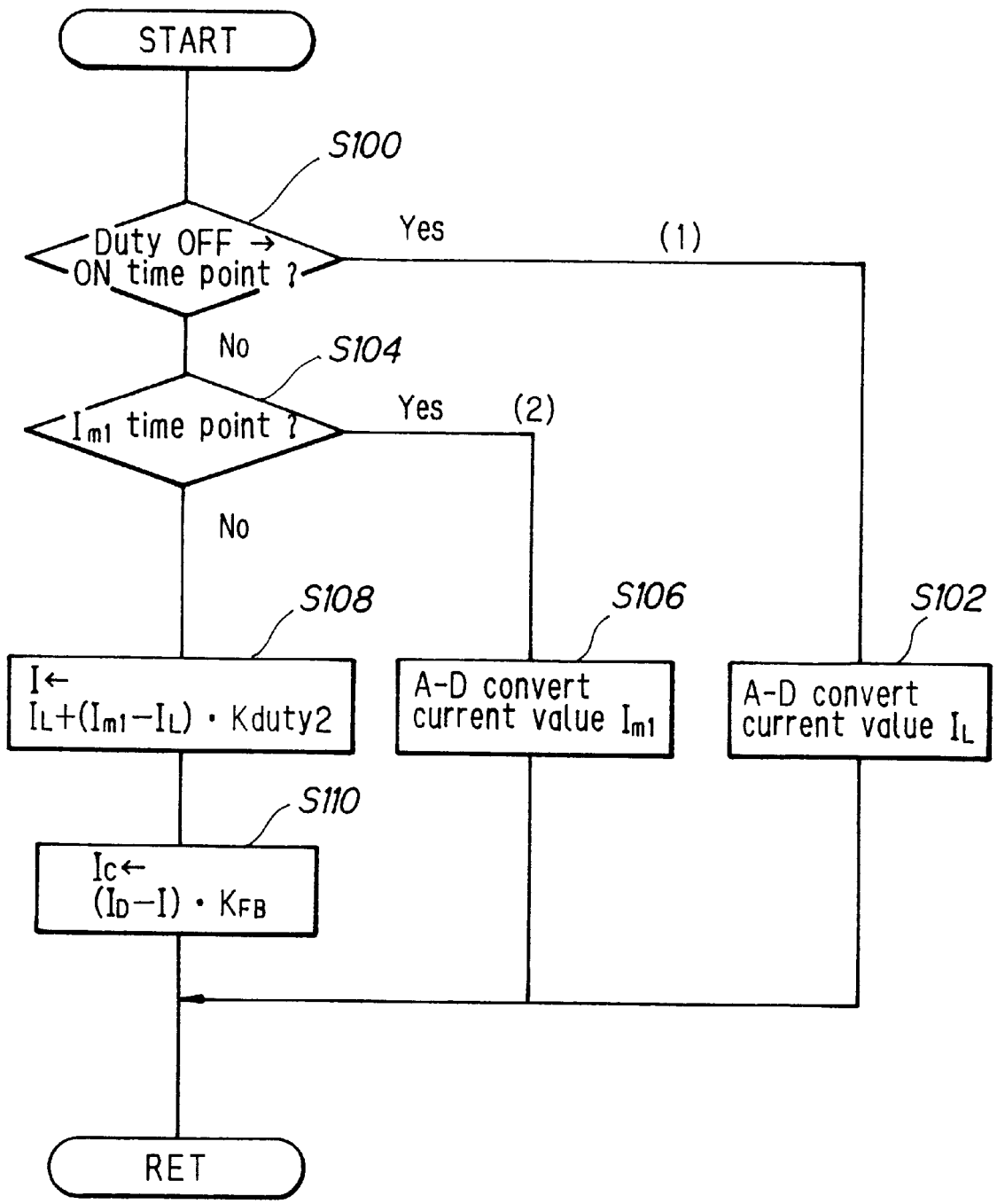
FIG. 7 is a flowchart showing the operation of the system according to a second embodiment of the invention.
Figure 8:
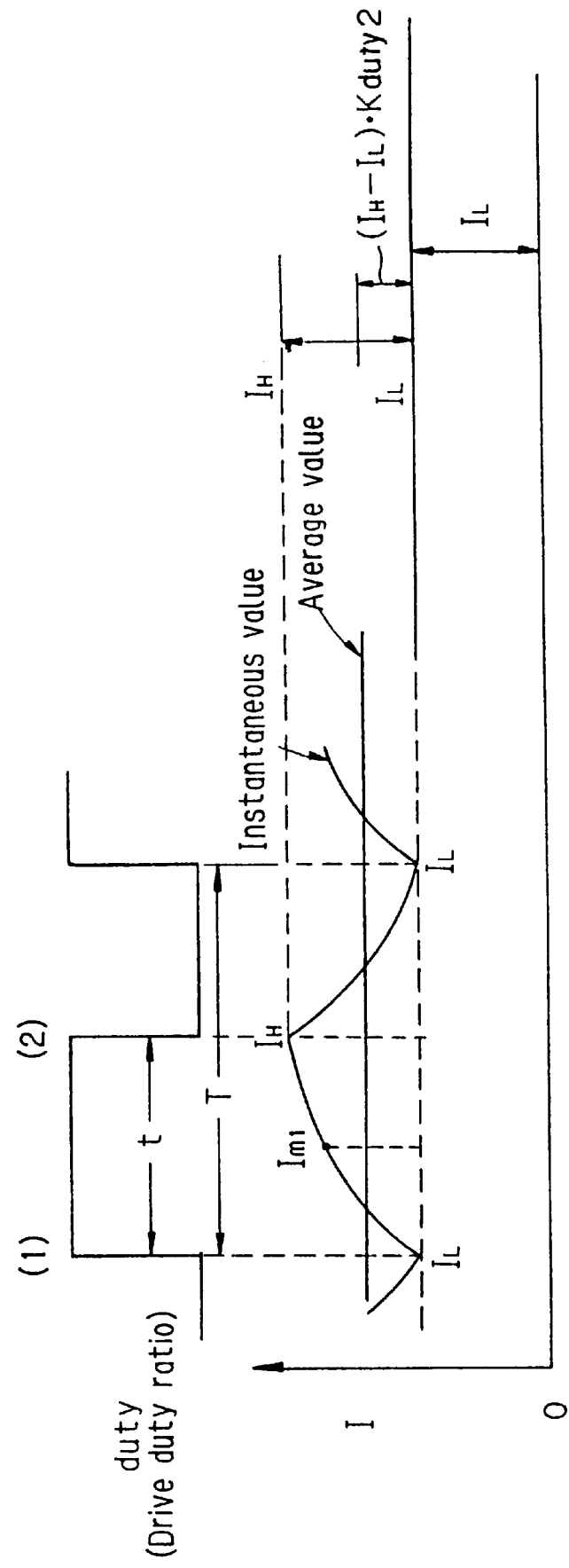
FIG. 8 is a timing chart explaining the procedures illustrated in the flowchart of FIG. 7.

FIGS. 7 and 8 are a flowchart similar to FIG. 3 and a timing chart similar to FIG. 4 showing a second embodiment of the invention.

In the second embodiment, the minimum value $I_L$ is again used as the first value, while as the second value there is used, not the maximum value $I_H$, but, as shown in FIG. 8, an intermediate (current) value $I_{m1}$ at a point midway in the time (period) between the drive (duty) pulse rise point (leading edge) (1) and fall point (trailing edge) (2).

The operation will be explained with reference to the flowchart of FIG. 7. First, in S100, it is checked whether it is the time at which the drive duty pulse is switching from OFF to ON, i.e., whether the drive duty pulse is at the rise point (leading edge)(1) shown in FIG. 8. When the result in S100 is YES, the program goes to S102, in which the current value detected at that point is A-D converted and the converted value is defined as the minimum value $I_L$, whereafter the routine is once terminated.

In the next and following routine cycles, when the result in S100 is NO, the program goes to S104, in which it is checked by clocking time passage whether the drive duty pulse is at the intermediate point $I_{m1}$. When the result is YES, the program goes to S106, in which the current value detected at this point is A-D converted and the converted value is defined as $I_{m1}$.

In the next and following routine cycles, when the results in S100 and S104 are NO, the program goes to S108, in which the detected current I is calculated using the following equation similar to the one given earlier:

$$I=I_L+(I_{m1}-I_L)\ Kduty2.$$

The program then goes to S110, in which the corrected command value $I_C$ is calculated.

Since in the second embodiment, as in the first, the detected value is not smoothed by a first-order delay, the current flow can be detected in real time, there-by enabling an improvement in response during feedback control based on the error between the detected and desired values.

Figure 9:
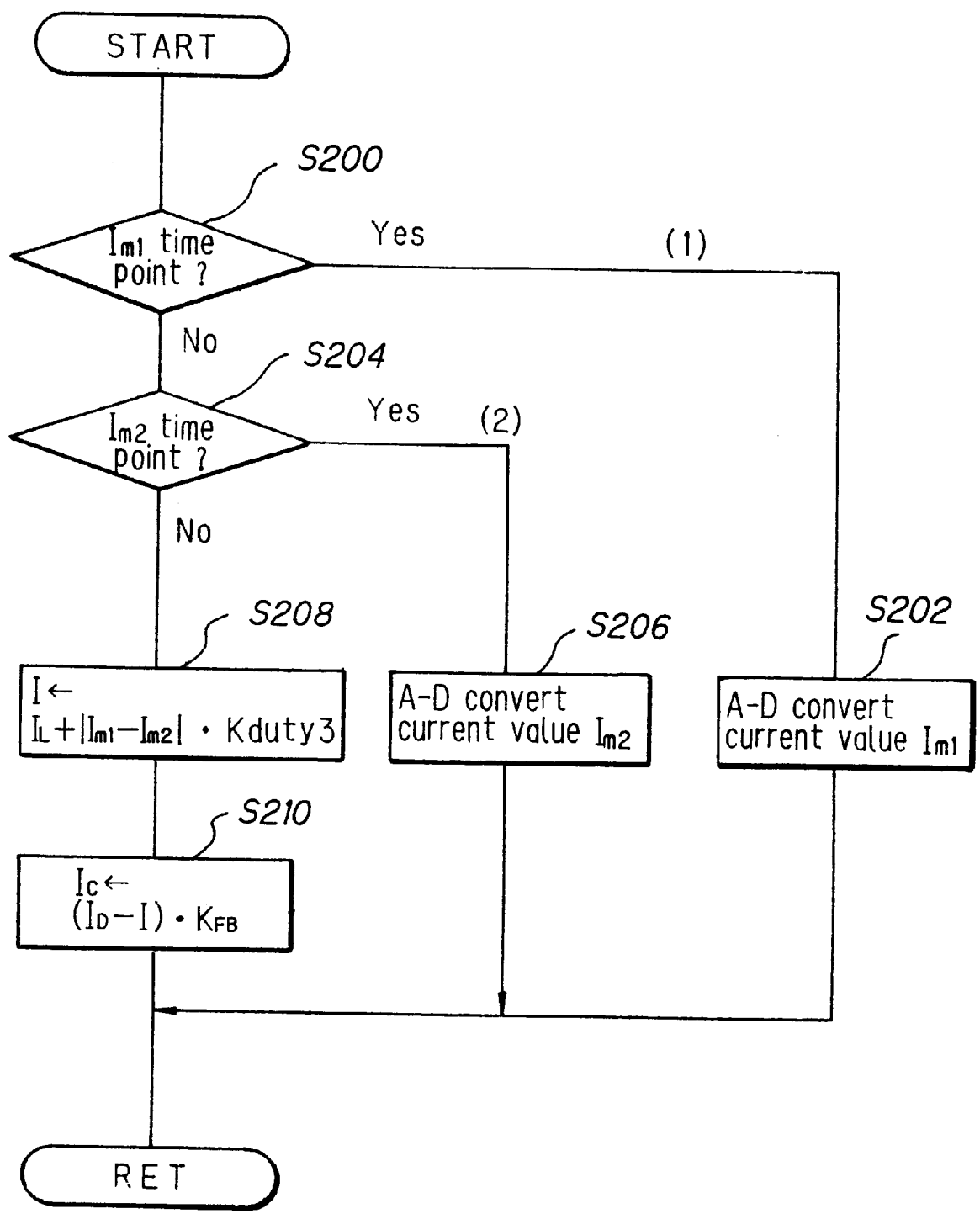
FIG. 9 is a flowchart showing the operation of the system according to a third embodiment of the invention.
Figure 10:
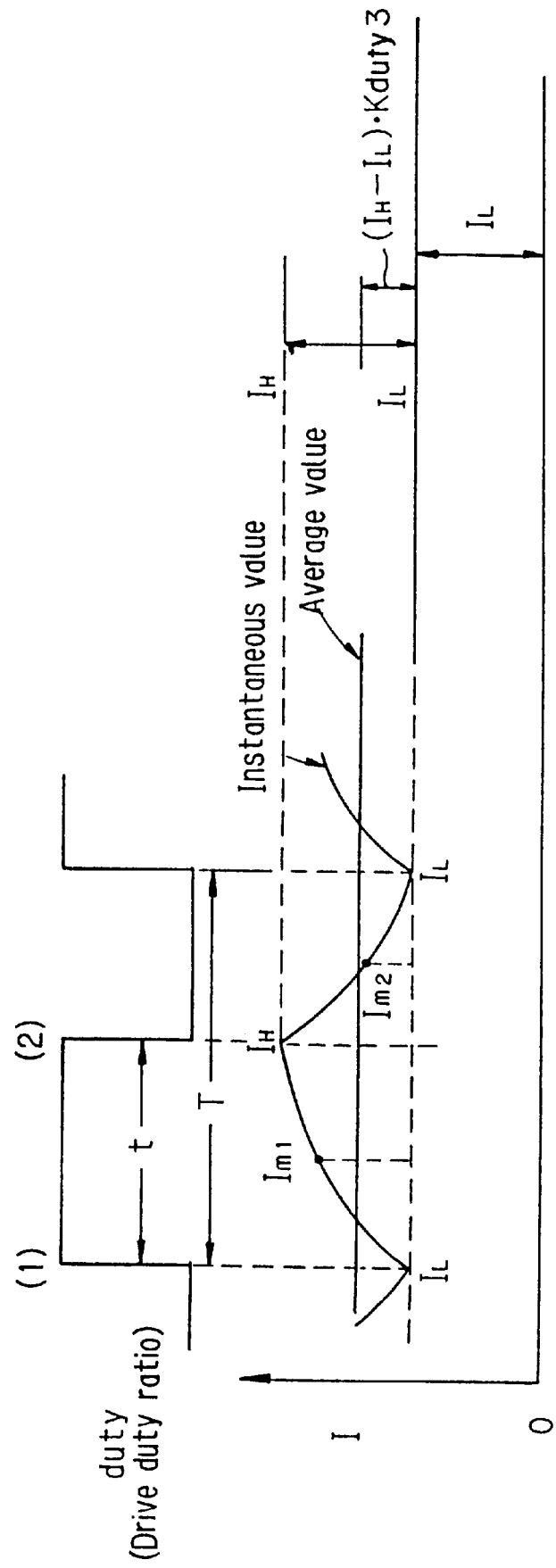
FIG. 10 is a timing chart explaining the procedures illustrated in the flowchart of FIG. 9.

FIGS. 9 and 10 are a flowchart similar to FIG. 3 and a timing chart similar to FIG. 4 showing a third embodiment of the invention.

In the third embodiment, the intermediate value $I_{m1}$ is used as the first value, while, as shown in FIG. 10, there is used as the second value an intermediate value $I_{m2}$ at a point midway in the time (period) between the drive pulse fall point (trailing edge) (2) and rise point (leading edge)(1). In other words, the first point is a point after a first predetermined time determined by the duty ratio has passed since a pulse leading edge and point (2) is a point at a second predetermined time determined by the duty ratio backward from a pulse leading edge.

The operation will be explained with reference to the flowchart of FIG. 9. First, in S200, it is checked whether the drive duty pulse is at the intermediate point $I_{m1}$. When the result in S200 is YES, the program goes to S202, in which the current value detected at that point is A-D converted and the converted value is defined as $I_{m1}$.

In the next and following routine cycles, when the result in S200 is NO, the program goes to S204, in which it is checked whether the drive duty pulse is at the intermediate point $I_{m2}$. When the result is YES, the program goes to S206, in which the current value detected at this point is A-D converted and the converted value is defined as $I_{m2}$.

In the next and following routine cycles, when the results in S200 and S204 are NO, the program goes to S208, in which the detected current I is calculated by obtaining the difference in the absolute value between the detected values and by multiplying the difference by the gain, as shown in the following equation similar to the ones given earlier:

$$I = I_L + |I_{m1} - I_{m2}| K duty 3.$$

The program then goes to S210, in which the corrected command value $I_C$ is calculated.

Since in the third embodiment, as in the first, the detected value is not smoothed by a first-order delay, the current flow can be detected in real time, there-by enabling an improvement in response during feedback control based on the error between the detected and desired values.

In the first to third embodiments, the current I is calculated using the specified pairs of values selected from among the minimum value $I_L$, maximum value $I_H$ and intermediate values $I_{m1}$, $I_{m2}$. Various pair combinations are possible, however, as in the following list:

$I_L$, $I_H$ . . . First embodiment
$I_{m1}$, $I_{m2}$ . . . Third embodiment
$I_L$, $I_{m1}$ . . . Second embodiment
$I_L$, $I_{m2}$
$I_{m1}$, $I_H$
$I_{m2}$, $I_H$ While the intermediate values $I_{m1}$, $I_{m2}$ are defined as the values at ½ the time period between the minimum value $I_L$ and the maximum value $I_H$, the invention is not limited to this definition and they can be any of various other values related to the minimum value $I_L$ and the maximum value $I_H$, such values at ⅓, ⅖ or other fractions of said time period. It is also possible to use a combination of three or more values. In this case, it suffices if Kdutyn is set beforehand with respect to the drive duty ratio in accordance with the intermediate setting points at ⅓, ⅖, etc.

While the foregoing description is made taking a linear solenoid as an example of an electronic device, this is not limitative. Although the linear solenoid used as an example is a linear solenoid used in a hydraulically operated vehicle transmission, the invention is not limited to this disclosed application.

Although the invention has thus been shown and described with reference to specific embodiments, it should be noted that the invention is in no way limited to the details of the described arrangements, changes and modifications may be made without departing from the scope of the invention, which is defined by the appended claims.

What is claimed is:

1. A system for controlling an electronic device through pulse-width modulation, comprising:
    current detecting means for detecting an actual current supplied to the electronic device at a predetermined duty ratio of the pulse-width modulation; and
    correcting means for correcting a command to be supplied to the electronic device based on a difference between the detected actual current and a current corresponding to the predetermined duty ratio;
    wherein said current detecting means includes:
        first point value detecting means for detecting the current supplied to the electronic device at a first time point;
        second point value detecting means for detecting the current supplied to the electronic device at a second time point;
        difference calculating means for calculating a difference between the first point value and the second point value;
        coefficient determining means for determining a coefficient based on the duty ratio; and
        current calculating means for calculating the current supplied to the electronic device based on the calculated difference and the determined coefficient.

2. A system according to claim 1, wherein the first time point value is a maximum value of the current supplied to the electronic device, and the second time point value is a minimum value of the current supplied to the electronic device.

3. A system according to claim 1, wherein the first time point value is a current value at a point after a first predetermined time determined by the duty ratio has passed since a pulse leading edge, and the second time point value is a current value at a point at a second predetermined time determined by the duty ratio backward from the pulse leading edge.

4. A system according to claim 1, wherein the first time point value is a current value at a point after a first predetermined time determined by the duty ratio has passed since a pulse leading edge, and the second time point value is a current value at a point after a second predetermined time determined by the duty ratio has passed since a pulse trailing edge.

5. A system according to claim 1, wherein the coefficient is determined based on the duty ratio.

6. A system for controlling an electronic device through a pulse-width modulation, comprising:
    current detecting means for detecting an actual current supplied to the electronic device at a predetermined duty ratio of the pulse-width modulation; and
    correcting means for correcting a command to be supplied to the electronic device based on a difference between the detected actual current and a current corresponding to the predetermined duty ratio;
    wherein said current detecting means includes:
        maximum current value detecting means for detecting a maximum value $I_H$ of the current supplied to the electronic device;
        minimum current value detecting means for detecting a minimum value $I_L$ of the current supplied to the electronic device;
        difference calculating means for calculating a difference ($I_H - I_L$) between the maximum value and the minimum value;
        coefficient determining means for determining a coefficient (Kduty) based on the duty ratio; and
        current calculating means for calculating the current (I) supplied to the electronic device based on the calculated difference and the determined coefficient as:

$$I = I_L + (I_H - I_L) \times K duty.$$

7. A system according to claim 6, wherein the coefficient is determined based on the duty ratio.

8. A system for controlling an electronic device through a pulse-width modulation, comprising:
    current detecting means for detecting an actual current supplied to the electronic device at a predetermined duty ratio of the pulse-width modulation; and
    correcting means for correcting a command to be supplied to the electronic device based on a difference between the detected actual current and a current corresponding to the predetermined duty ratio;

wherein said current detecting means includes:
- maximum current value detecting means for detecting a maximum value $I_H$ of the current supplied to the electronic device;
- minimum current value detecting means for detecting a minimum value $I_L$ of the current supplied to the electronic device;
- midway point value detecting means for detecting a midway point value $I_{m1}$ between the maximum value $I_H$ and the minimum value $I_L$;
- difference calculating means for calculating a difference ($I_{m1}-I_L$) between the midway point value and the minimum value;
- coefficient determining means for determining a coefficient (Kduty2) based on the duty ratio; and
- current calculating means for calculating the current I supplied to the electronic device based on the calculated difference and the determined coefficient as:

$$I = I_L + (I_{m1} - I_L) \times \text{Kduty2}.$$

9. A system according to claim 8, wherein the coefficient is determined based on the duty ratio.

* * * * *